Patented May 12, 1931

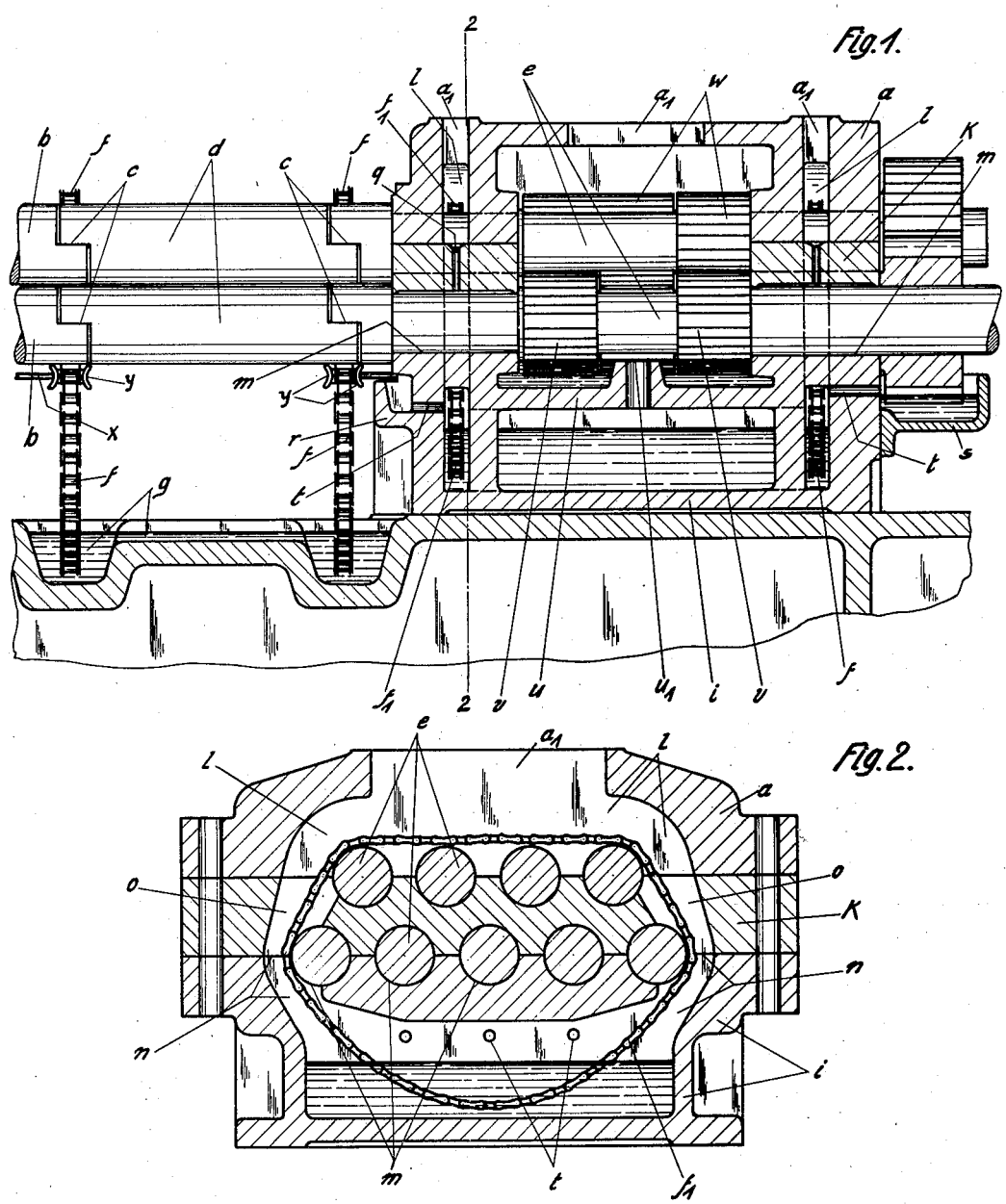

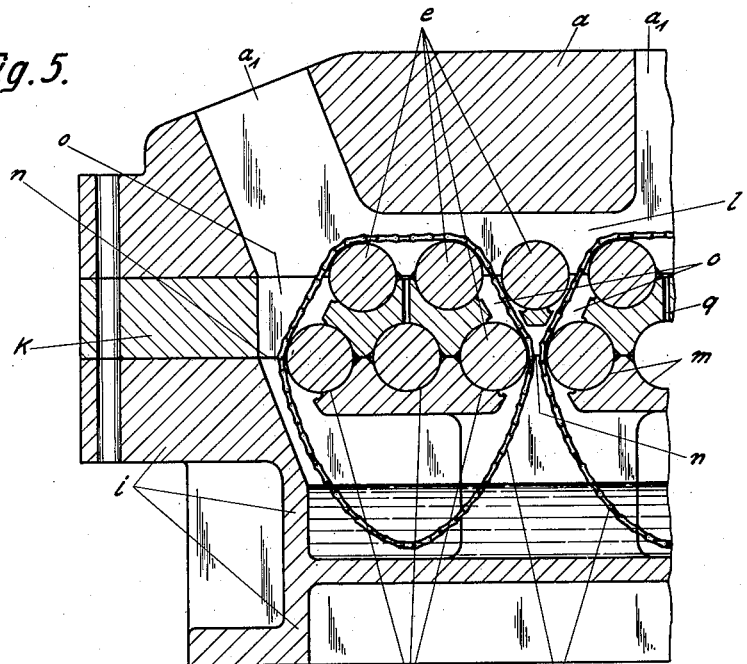
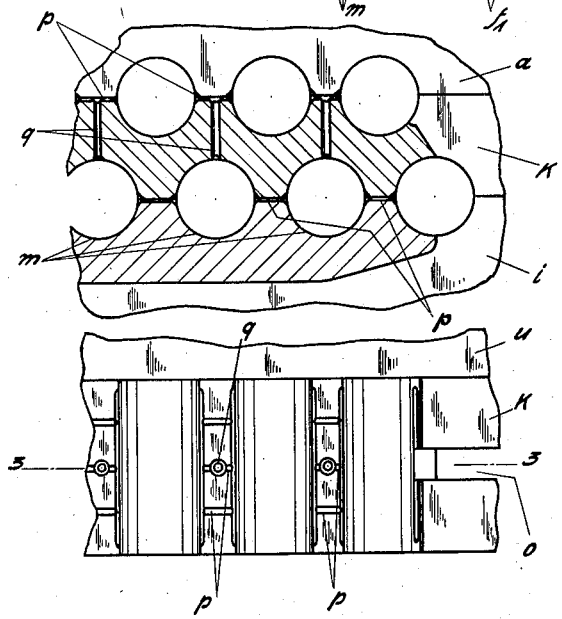
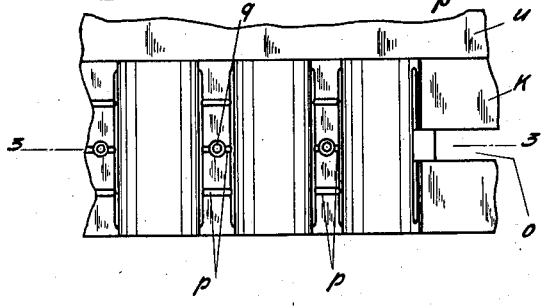

1,804,571

UNITED STATES PATENT OFFICE

FRITZ UNGERER, OF PFORZHEIM, GERMANY

LUBRICATING ARRANGEMENT FOR PLATE STRAIGHTENING OR ROLLING MACHINES

Application filed January 11, 1929, Serial No. 331,908, and in Germany January 16, 1928.

This invention relates to an arrangement designed for the lubricating of all the driving points for the rolls of plate straightening or rolling machines. The rolls are generally driven from a main shaft driven itself by an engine and from which the distributing of the driving power is effected externally and internally of a gear box, by means of several spur wheel gears, upon the several driving points for the rolls, which are then connected by means of clutch shafts with the rolls proper of the sheet metal straightening or rolling machine.

It is an old experience that the movable clutches of the clutch-shaft are exposed to rapid wear. The reason therefore is, that it is left to the attendants of the machine to pour oil upon the clutch points by means of an oil can. This is frequently omitted or not carried out with the necessary accuracy as the joints, owing to the slight relative movements of their elements, are often not considered as points very much in requirement of lubricating. Although the mutual movement of the clutch elements is only very slight, the friction surfaces are submitted to considerable stress owing to the great forces to be transmitted in machines of this type. Even at repeated lubricating the lubricant cannot fulfill the purpose aimed at, i. e. to prevent wear, in the full measure as it drops frequently off the coupling points without getting on the surfaces requiring lubrication, so that the lubricant remains useless.

No arrangement has become known capable to supply lubricant continually to the movable clutches of sheet metal straightening- or rolling machines during the operation.

The commonly used lubricating arrangements for the other gear elements serving for the distribution of the driving power are also imperfect. The lubricating of the great number of driving shaft bearings located in the gear box is in most cases at strong stress not sufficient to prevent running hot of the bearings. Also the wick lubrication, which has already been proposed for the gear box lubrication, presents several inconveniences. On the one hand lubricating by means of wicks is rather slow, and on the other hand the wicks continue to supply oil unnecessarily when the machine has been stopped, whereby much oil is lost. Wick lubricating requires further the arrangement of oil cups in the upper part of the gear box, wherefrom results, in the case that the oil cups are not of very small size which would be prejudicial to the machine, an increasing of the height of the gear box. Wick lubricating facilitates further clogging of the oil passages owing to resinification of the oil or to accummulation of dirt.

This invention provides a solution by which all the existing inconveniences are obviated.

The problem to be solved is to make the oil circulate during the operation of the machine in order to obtain an economical but absolutely reliable oil-washing of all elements submitted to stress.

In the accompanying drawings a lubricating arrangement for the movable clutches and two embodiments of the lubricating arrangements for the other gear elements of a sheet metal straightening machine are illustrated by way of example.

Fig. 1 shows in longitudinal section the gear box and the clutch elements connecting the gear elements with the straightening rolls, Fig. 2 is a section on line 2—2 of Fig. 1 showing one lubricating chain.

Fig. 3 shows a portion of the gear box wall in section on line 3—3 of Fig. 4.

Fig. 4 shows a portion of the gear box wall in a top plan view on the intermediate box part, the upper part of the box being removed, Fig. 5 shows the section through the gear box wall on line 2—2 of Fig. 1 with the arrangement of several lubricating chains.

The straightening rolls of the plate straightening machine are not shown in the drawing, however their clutch heads $b$ are shown.

The joint clutches $c$ are for instance of the type of the claw clutches. The new lubricating arrangement may however be applied also on plate straightening or rolling machines comprising clutches of any other type. Over each clutch point of the clutch shafts $d$, by which the upper straightening rolls are connected to the upper driving shafts $e$, an endless chain $f$ is hung, which dips into an oil cup $g$ arranged under the clutch points. The chain $f$ is preferably a Gall's chain, any other suitable endless structure, as for instance a thin perforated belt, may however be used. During the operation of the machine the chains $f$ draw continually oil from the oil cup $g$ to pour the same onto the clutch points, whereby such an ample washing with oil is effected, that the oil flows on all friction surfaces, drops further from the upper clutch points to the lower ones, the oil in excess returning then into the cup $g$. The outer clutch points of the lower clutch shafts $d$ are directly in touch with the oil chains $f$. All the clutch gears together with the cup $g$ are covered with a common hood of sheet metal, not shown in the drawing, so that they are protected against dirt and dust.

The gear box, which serves for journaling the upper and lower driving shafts $e$ and for accommodating the spur wheel gears, is composed of three main parts, i. e. the bottom part $i$, the intermediate part $k$ and the top part $a$ with several box lids covering the oil inlet holes $a'$, said covers being not shown in the drawing. The bottom part $i$ of the box might be called the oil box, and it has at each end of the rows of bearings $m$ in which the journals of the lower driving shafts are journaled, an aperture $n$ for the endless oil chains $f'$ which supply with oil all the bearings for the driving shaft journals. They draw during the running of the machine from the bottom part $i$ of the box. The intermediate part $k$ of the box, which consists of a frame, is mounted on the bottom part $i$ and forms the upper brasses for the lower and the lower brasses for the upper driving shaft journals. This intermediate part $k$ has also, at each end of the rows of bearings in which the upper driving shaft journals are running, an upper passage $o$ for the chains $f'$ which are hanging on the upper driving shaft journals and touch with the chain side extending through the channels $o$ and $n$ into the oil box $i$ also the outer driving shaft journals of the lower row to supply them with oil. In the upper part $a$ of the gear box, which forms the upper brasses for the upper driving shaft journals, one longitudinal groove $l$ extending through all the bearings is arranged at each side in the direction in which the chains $f'$ move, these chains travelling through this groove. Owing to this arrangement oil in excess is supplied to each one of the upper driving shaft journals. In the joint of the bearings for the upper driving shaft journals as well as in the joints of the lower bearings lubricating grooves $p$ are arranged connecting the several bearings and designed to equalize the oil quantity in the bearings and further, in the two upper rows of bearings, to convey oil stripped off the shaft journals and dropping off the chains $f'$ into funnel-shaped bores $q$ downwardly directed between the several bearings in the joint and ending directly in the bearings for the lower driving shaft journals, said bearings being displaced with regard to the upper bearings, so that a sufficient quantity of oil is supplied also to each one of the inner lower driving shaft journals.

The oil flowing out in outward direction from the bearings in the gear box is collected in oil catchers $r$ and $s$ arranged on the two sides of the gear box and on the bottom part $i$, the oil returning from these oil catchers through the openings $t$ into the bottom part $i$ of the box or into the oil box proper, into which the chains $f'$ dip.

The considerable oil losses which hitherto were caused by the flowing out of the oil from the bearings of the driving shaft journals are completely avoided in this manner.

The oil which flows in inward direction from the gear box bearings does not return directly into the oil box $i$ but collects first on the upper plate $u$ of the oil box $i$, which forms in this manner two superimposed oil containers.

The oil in the upper container collecting on plate $u$ flows along the lower pinions $v$, which convey the oil to the upper pinions $w$, so that the total spur wheel gear is so to say bathed in oil. The oil level in this upper container rises to the discharge hole $u'$, through which the oil returns into the lower oil container. This discharge hole $u'$ is however not absolutely necessary. If it is not provided, the oil rises to the lower bearings $m$ of the driving shaft journals, flows through these bearings in outward direction and into the oil catchers $r$ and $s$, from which it returns through the passages $t$ into the lower oil container.

In machines of small and medium size the entire hollow space of the bottom part $i$ of the box situated under the plate $u$ can form one oil container as shown in the drawing. In large size machines, in which this hollow space in the bottom part $i$ of the box is of great dimensions and would consequently collect an unnecessarily large quantity of oil, two smaller oil spaces, separated from each other, may be arranged, one under each of the two rows of bearings $m$ in the lower part $i$ so that the chains $f'$ dip into separate oil chambers. When, at the arrangement of such separate oil chambers differences exist in the diameters of the lower driving shaft journals at the two sides, all the oil flowing out of the upper container formed by plate $u$ would flow off to that side of the box on which the bearings of greater diameter are situated, so that too little oil would be supplied to the one oil chamber and too much oil to the other oil chamber. To prevent this, the oil discharge from the upper oil container is not left to the journal bearings, holes situated all at the same height being provided above the plate $u$, to serve for discharging the oil towards both sides of the lower box part $i$, these holes allowing uniform discharging of the oil in excess towards the two lower oil chambers.

Shoes $y$, in which the hanging chains sides $f$ are guided and which are mounted on a bolt $x$, serve to prevent lateral movement of the chains $f$ from the clutch points during the operation.

I claim:

1. A lubricating arrangement for plate straightening- or rolling machines, comprising in combination with the accumulated clutch points of the straightening rolls with the clutch shafts and of the driving shafts with said clutch shafts, an endless chain on each clutch point, and an oil sump under the clutch points into which the chains dip to draw oil and to supply the same to the clutch points during the operation of the machine.

2. A lubricating arrangement for plate straightening- and rolling machines, comprising in combination a gear box composed of a bottom part forming an oil sump and having a passage at each side, of an intermediate part having a passage at each side, and of a top part having a longitudinal groove in the front side wall and in the rear side wall, an upper and lower row of driving shaft journals journalled in said gear box, and endless chains hanging on said driving shaft journals one at each side dipping into said oil sump and extending through said longitudinal grooves of said top part and through the lateral passages of said intermediate and said bottom parts of said gear box.

3. A lubricating arrangement for plate straightening- and rolling machines, comprising in combination a gear box composed of a bottom part forming an oil sump and having a passage at each side, of an intermediate part having a passage at each side, and of a top part having a longitudinal groove in the front side wall and in the rear side wall, an upper and lower row of driving shaft journals journalled in said gear box, and endless chains hanging on said driving shaft journals one at each side dipping into said oil sump and extending through said longitudinal grooves of said top part and through the lateral passages of said intermediate and said bottom parts of said gear box said gear box having an upper row and a lower row of bearings for said driving shaft journals said rows arranged on the one hand in the bottom part and intermediate part and on the other hand in the intermediate part and top part of said gear box connecting grooves in the joints of said three parts of the gear box connecting the bearings in each row and vertical bores in the walls of said intermediate part of said gear box between said bearings of said upper row and ending in the bearings of said lower row.

4. A lubricating arrangement for plate straightening- and rolling machines, comprising in combination a gear box composed of a bottom part forming an oil sump and having a passage at each side of an intermediate part having a passage at each side, and of a top part having a longitudinl groove in the front side wall and in the rear side wall, an upper and lower row of driving shaft journals journalled in said gear box, endless chains hanging on said driving shaft journals one at each side dipping into said oil sump and extending through said longitudinal grooves of said top part and through the lateral passages of said intermediate and said bottom parts of said gear box, a plate on said lower part of said gear box forming an upper oil sump communicating with said oil sump in said lower part of the gear box, and pinions on said driving shafts immersed in said upper oil sump.

5. A lubricating arrangement for plate straightening- and rolling machines, comprising in combination a gear box composed of a bottom part forming an oil sump and having a passage at each side of an intermediate part having a passage at each side, and of a top part having a longitudinal groove in the front side wall and in the rear side wall, an upper and lower row of driving shaft journals journalled in said gear box, endless chains hanging on said driving shaft journals one at each side dipping into said oil sump and extending through said longitudinal grooves of said top part and through the lateral passages of said intermediate and said bottom parts of said gear box, a plate on said lower part of said gear box forming an upper oil sump communicating by means of overflow holes with said oil sump in said lower part of the gear box, and pinions on said driving shafts immersed in said upper oil sump.

6. A lubricating arrangement comprising in combination with the clutch lubricating chain as specified in claim 1, a gear box forming an oil sump, driving shaft journals in said gear box driven by said clutch, and an endless chain passing over each row of journals and dipping in said oil sump adapted to supply oil to said journals.

7. A lubricating arrangement comprising in combination with the clutch lubricating chain as specified in claim 1, a gear box forming an oil sump, driving shaft journals in said gear box driven by said clutch, an endless chain passing over each row of journals and dipping in said oil sump adapted to supply oil to said journals, an oil catcher on each end wall under said rows of bearings, and channels connecting said oil catchers with said oil sump.

8. A lubricating arrangement comprising in combination with the clutch lubricating chain as specified in claim 1, a bolt, and guide shoes on said bolt for preventing lateral movement of said endless chain.

In testimony whereof I affix my signature.

FRITZ UNGERER.